Oct. 14, 1969          P. HUSKA          3,472,097
REVERSIBLE SPEED REDUCER
Filed March 21, 1966
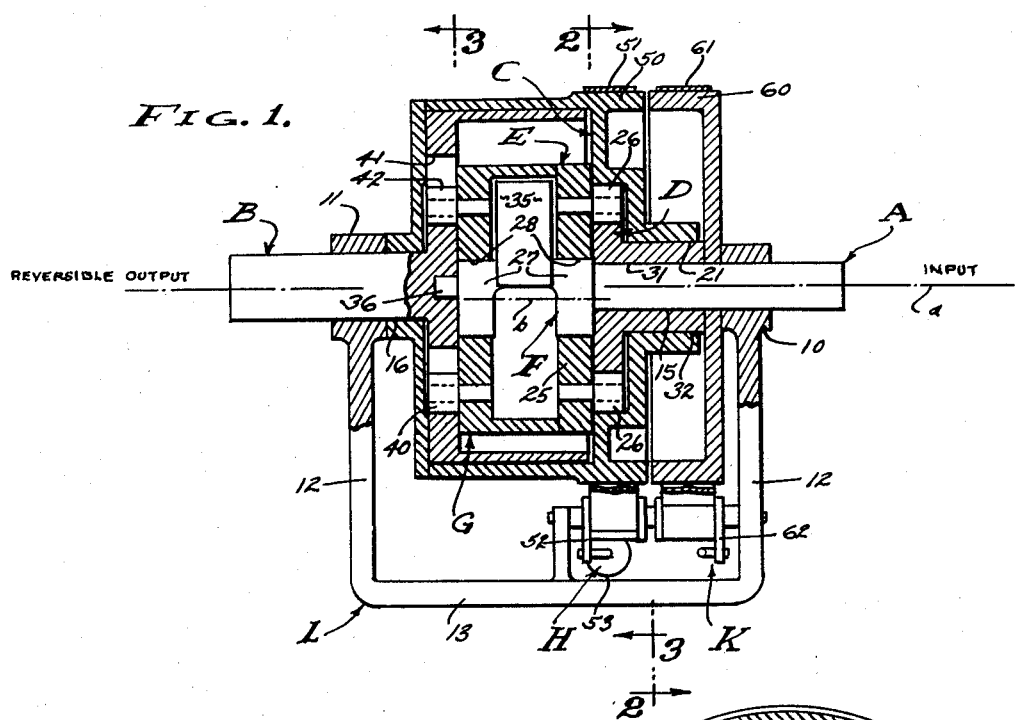
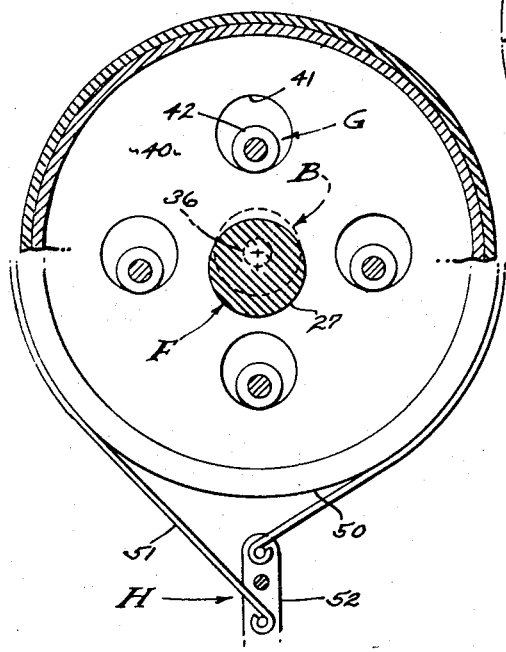
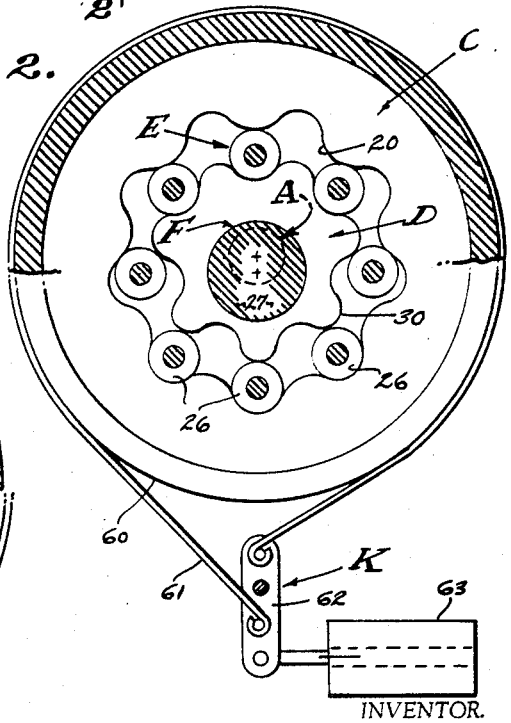
INVENTOR.
PAUL HUSKA
BY
AGENT

United States Patent Office 3,472,097
Patented Oct. 14, 1969

3,472,097
REVERSIBLE SPEED REDUCER
Paul Huska, 1150 18th St., Santa Monica, Calif. 90403
Filed Mar. 21, 1966, Ser. No. 535,986
Int. Cl. F16h 57/10, 1/28
U.S. Cl. 74—760                                     1 Claim

ABSTRACT OF THE DISCLOSURE

This invention relates to a rotatable speed reducer that is reversible from a neutral condition while the input thereto is continuous, it being a general object of this invention to provide a reversible speed reducer involving but few parts and which operates smoothly and efficiently.

---

In place of the usual gear forms that characterize speed reducers, this invention employs a pair of relatively rotatable control elements and at least one driving element which comprises circumferentially spaced revolvable bearings. More specifically, this invention involves two relatively rotatable control elements which are preferably of sinusoidal form, and one rotatable and eccentrically movable driving element that involves circumferentially spaced bearing forms. The latter mentioned element is driveably engaged, continuously, between the first two mentioned elements, and said two elements are independently braked for determining rotation and direction thereof. The rotational power input and output is primarily through eccentrically moving elements cooperatively related to the two control elements and the intermediate driving element, whereby reversibility is obtained from a constantly rotating input drive shaft, there being a neutral condition permitting continuous rotation of the input drive shaft, and there also being a locked condition for all shafting involved.

In practicing this invention in its preferred form, two of the said transmission elements are of sinusoidal form and the remaining third transmission element involves circumferentially spaced bearing forms, it being characteristic with the invention that at least two of said three elements have differential in division or number of forms therein respectively. For example, one of said transmission elements has one less division than the other, whereby a speed change is realized. In the embodiment disclosed the device operates both forwardly and reversely at the same ratio of speed change, in which case one sinusoidally formed element has one more division than the intermediate bearing form element, while the other sinusoidally formed element has one less division than the said intermediate bearing form element. As a result, a process occurs which forwardly or reversely revolves the intermediate bearing form at the same reduced speed in either instance.

It is an object of this invention to provide reversibility of rotation at the driven shaft of a transmission that is powered at a continuously rotating drive shaft.

It is also an object of this invention to provide rotational speed change in either direction of rotation of the driven shaft, in a transmission of the type thus far referred to. With the present invention the speed change ratios can vary independently for each direction of rotation, usually so as to reduce the speed of the driven shaft with respect to the speed of the driving shaft. However, it is feasible to have the same ratio in either direction, and it is also feasible to have increasing ratios rather than reducing ratios.

It is still another object of this invention to provide a transmission having the features hereinabove referred to and wherein there is a neutral condition in which the drive can continuously revolve without effect; and also wherein there is a locked condition in which both the drive and driven shaft are fixed against rotation when rotational locking thereof is so required.

The various objects and features of this invention will be fully understood from the following detailed description of the typical preferred form and application thereof, throughout which description reference is made to the accompanying drawings, in which:

FIG. 1 is a longitudinal sectional view of the speed reducer embodying the present invention.

FIGS. 2 and 3 are sectional views taken substantially as indicated by lines 2—2 and 3—3 on FIG. 1.

The reversible speed reducer that I have illustrated is such as to reversibly decrease the speed of rotation between a drive shaft A and a driven shaft B. Accordingly, the invention is embodied in a transmission which involves, generally, said shafts A and B, a forward speed control element C, a reverse speed control element D, a driving element E, eccentric drive means F from the drive shaft A to the driving element E, coupling means G from the driving element E to the driven shaft B, and brake means H and K for the control elements C and D respectively. The above mentioned parts are encased within parts of one or more of the elements involved as is shown, and preferably with the exception of the brake means H and K which are exposed for ease of actuation. Further, the combined assembly is mounted upon a supporting frame L or the like, to which the brake means H and K are anchored. Generally, the shafts A and B and speed control elements C and D are coaxially centered on the driving axis $a$ of the device while the driving element E is centered eccentrically at $b$ with respect to said driving axis, each of said parts A through E being independently rotatable with respect to the other except for the driving inter-engagement hereinafter described.

The frame L can vary widely in design and since it is useful to establish an anchor for the brake means H and K related to the axis $a$, the frame L is journaled about the rotatable parts of the device on said axis $a$, As shown, the two shafts A and B are each journaled in bearings 10 and 11, said bearings being carried by uprights 12 carried by a base 13, all part of the frame L. The shafts A and B are coaxially journaled by the bearings 10 and 11, so as to project oppositely into and from the device at the two ends thereof.

The drive shaft A enters into the device through bearing 10 and can be the smaller of the two shafts, being continuously revolved by a prime mover (not shown) except when the locked condition is imposed. The shaft A is straight with a cylindrical bearing surface 15 inward of the bearing 10 to carry the reverse speed control element D. The terminal inner end of the shaft A is exposed to the interior of the device to carry the driving element E through the intervening drive means F.

The driven shaft B exits from the device through bearing 11 and can be the larger of the two shafts, being forwardly and reversely revolved through coupled engagement with the driving element E by the coupling means G. The shaft B is straight with a cylindrical bearing surface 16 inward of bearing 11 to carry the forward speed control element C. The terminal inner end of the shaft B is exposed to the interior of the device to engageably carry a part of the coupling means G.

The two transmission control elements C and D are essentially alike and differ in that the forward speed control element C is an internally formed element while the reverse speed control element D is an externally formed element. Said two elements C and D are in a sense comparable to internal and external gears, however the internal and external forms thereof are of sinuous configuration and in each instance shown are comprised of a regular series of bends that are of undulating form rather than of spaced gear tooth form, and preferably of a radially displaced sine wave form as developed from or generated from the related eccentric motion of the driving element E. Consequently, the undulating sine wave form that I prefer to employ is comparable with conventional gearing, in which case the usual addendum and dedendum as separated at the circular pitch line each has an exactly equivalent counterpart in the sine wave form here employed. As is illustrated, the forward speed control element C has a sinous face 20 that involves nine divisions with nine concaved (dedendum) depressions and nine intermediate convex inwardly projecting cam-shaped (addendum) lobes; while the reverse speed control element D has a sinous face 30 that involves seven divisions with seven concaved (dedendum) depressions and seven intermediate convex outwardly projecting cam-shaped (addendum) lobes. In practice, the elements C and D are concentrically rotatable elements disposed in the same revolvable plane, the element D being operable within the confines of element C. Therefore, it is most practical to journal the latter element D within the former element C in order to rotatably support the said forward speed control element C. To this end, the element D has a cylindrical bore 31 rotatable on the bearing surface 15 of shaft A, and the element C has a cylindrical bore 21 rotatable on a cylindrical bearing surface 32 on said element C. Consequently the elements C and D are independently revolvable on a concentric axis, the axis $a$.

The group of drive elements which characterizes this transmission is completed with the inclusion of the driving element E which is juxtapositioned between the two concentrically rotatable elements C and D. Although the element E involves a disc-shaped body 25 for its support upon the drive means F, it primarily involves a spaced bearing configuration, in this instance a series of pins or revolvable anti-friction roller or ball type bearings 26. The pins or bearings 26 are carried by the body 25, equally spaced in a circumferentially disposed series. It is to be understood that it is the externally exposed sides of the bearings 26 which also and/or engage the circumferentially opposed sinous faces 20 and 30. The revolvable bearings 26 are eight in number, one less as compared to the number of divisions in element C, and one more as compared to the number of divisions in element D. As a result of these differentials in sine wave division and bearing number, there is a steady angular velocity differential created in each instance between the transmission elements C and E, and transmission elements D and E. As a result of the arrangement of elements shown, the driving element E is revolved at a reduced speed of rotation in each instance with respect to the speed of rotation of drive shaft A.

The eccentric drive means F is provided to move the body 25 of the driving element E through a motion that is lateral with respect to the two speed control elements C and D. The said eccentric motion and depths of the sine wave forms are the same, with working clearances provided for, and as is shown the means F involves an eccentric 27 integral with the inner terminal end of the shaft A, and upon which the body 25 is rotatably carried with its axis $b$ offset from central axis $a$. In the interest of counterbalancing the eccentric motion, the driving element E is a cage-like structure with spaced eccentric bearings 28 rotatable on spaced portions of the eccentric 27, with a chamber 28 therebetween in which a balance weight 35 operates in opposition to movement of the element E. Further, there is a projecting pilot 36 which extends from one shaft to engage with the other on the axis $a$.

With the group of elements C, D and E associated and driven by the drive means F as above described, the transmission in the form of regular and continuous sinusoids are engaged by regularly spaced bearings moving in a path eccentrically related thereto and adapted to have a continuous rolling and/or camming action that rotatably displaces the sinusoids relative to the said spaced bearings. The driving function of said sinusoids is known in this art, and the speed ratios that are available are diversified and depend upon the selection of sinusoid divisions as related to circumferential spacings of the drive bearings.

The coupling means G is provided to transmit rotation of the disc shaped body 25, or cage-like configuration of element E, to the driven shaft B. Although this coupling means can vary it is preferably a pin and aperture drive that compensates for the eccentric motion of the driving element E. In the preferred form of the invention there is a drive wheel 40 integral with the inner terminal end of the shaft B, and there is an aperture 41 disposed axially of the shaft B, and there is an aperture 41 disposed axially in the inner face of said wheel and displaced radially from the axis $a$. Said aperture 41 is circular in configuration and its diameter corresponds to the eccentricity of the means F. There is a drive pin 42 or roller bearing projecting axially from the disc-shaped or cage-like element E, said pin 42 being round and prepositioned so as to enter into said aperture and to continuously engage and ride around and within the circular wall of the same. In practice there is a circumferential series of apertures 41 and pins 42 in and on the wheel and element E respectively. As a result, the rotary motion of driving element E is transmitted to the driven shaft B.

In order for the parts A through G to be utilitarian it is necessary to anchor one or more of the speed control elements C and D. That is, it is necessary that either or both of said elements be releasably anchored with respect to the foundation of the prime mover (not shown). In this instance, the anchoring foundation is the frame L and in accordance with the invention I provide the brake means H and K that selectively and releasably anchor the elements C and D respectively. It is preferred that the means H and K be alike and to this end each involves a drum of the same diameter, there being a drum 50 formed of the peripheral portion of the forward speed control element C and a drum 60 formed of the peripheral portion of the reverse speed control element D. A brake band 51 is engaged around the drum 50, and a brake band 61 is engaged around the drum 60, there being actuating means 52 and 62 mounted on the frame L and anchored thereto and operative through means such as solenoids 53 and 63 to close the said brake bands onto the said drums respectively.

From the foregoing it will be seen that the group of three transmission elements is operative through the selective actuation of the brake bands 51 and 61. The neutral condition of the device is established by relaxing of both brake bands 51 and 61, in which case there is no anchor against which the driving element E can be driven and consequently the elements C and D revolve oppositely and freely. The forward condition of the device is established by actuating the brake band 51 in which case there is anchored engagement of the forward speed control element C and consequent forward rotation of the driving element E. The reverse condition of the device is established by actuating the brake band 61, in which case there is anchored engagement of the reverse speed control element D and consequent reverse rotation of the driving element E. In each of the last two mentioned conditions there is an advancement or regression of driving bearings 26 as related to the division of the sinusoidal wave form that is engaged thereby. As a result, the driving element E is revolved forwardly or reversely one relative division for each revolution of the shaft A and eccentric 27 revolved thereby. The locked condition of the device is established by simultaneously engaging both brake bands 51 and 61, in which case the anchorage prevents rotation in either direction and consequently both shafts A and B are locked against rotation.

Having described only a typical preferred form and application of my invention, I do not wish to be limited or restricted to the specific details herein set forth, but wish to reserve to myself any modifications or variations that may appear to those skilled in the art and fall within the scope of the following claim.

Having described my invention, I claim:

1. A reversible speed reducer including, a frame with oppositely disposed drive and driven shafts journaled independently on a common axis extending through said frame, two only concentric and independently revolvable speed control elements rotatably journaled on said common axis and of radially opposed internal and external addendum-dedendum form respectively, a single third driving element comprised of circumferentially spaced bearings juxtapositioned between the opposed addendum-dedendum forms of the two first mentioned elements, there being a difference of one in the number of addendum-dedendum form divisions as compared with the number of bearing positions whereby angular velocity change is effected, drive means on the drive shaft eccentrically and revolvably carrying said driving element in continuous engagement with and between said addendum-dedendum forms, brake means selectively anchoring each of the two first mentioned elements, means rotatably coupling the driving element and said driven shaft, whereby rotation of the drive shaft revolves the driven shaft in reverse directions and at reduced speed of rotation in response to said selective anchoring of the speed control elements, and wherein said driving element is of cage-like construction defining a chamber and wherein the drive shaft and drive means carries a balance within the chamber to counter the eccentric movement of the driving element.

References Cited

UNITED STATES PATENTS

| | | | |
|---|---|---|---|
| 908,529 | 1/1909 | Williams | 74—804 |
| 964,180 | 7/1910 | Peters | 74—788 |
| 1,144,092 | 6/1915 | Apple | 74—804 |
| 1,773,568 | 8/1930 | Braren | 74—804 |
| 1,833,993 | 12/1931 | Hill | 74—804 X |
| 2,861,481 | 11/1958 | Sundt | 74—760 |

FOREIGN PATENTS 255,330  1/1913  Germany.

DONLEY J. STOCKING, Primary Examiner

THOMAS C. PERRY, Assistant Examiner

U.S. Cl. X.R.

74—804, 805